United States Patent
Okada et al.

(10) Patent No.: US 7,278,020 B2
(45) Date of Patent: Oct. 2, 2007

(54) DIGITAL WATERMARKING APPARATUS AND APPLICATION APPARATUS USING THE SAME

(75) Inventors: Takanori Okada, Toyonaka (JP); Shuichi Yoshida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 846 days.

(21) Appl. No.: 10/621,308

(22) Filed: Jul. 18, 2003

(65) Prior Publication Data
US 2004/0015698 A1    Jan. 22, 2004

(30) Foreign Application Priority Data
Jul. 19, 2002    (JP)    ............... 2002-210728

(51) Int. Cl.
*H04L 9/00*    (2006.01)
(52) U.S. Cl. .................................... 713/176
(58) Field of Classification Search ............... 380/252, 380/253, 254; 713/176
See application file for complete search history.

(56) References Cited

U.S. PATENT DOCUMENTS

| | | | |
|---|---|---|---|
| 6,453,053 B1 | 9/2002 | Wakasu | |
| 6,785,815 B1* | 8/2004 | Serret-Avila et al. | 713/176 |
| 2002/0108043 A1 | 8/2002 | Tanaka | |
| 2004/0128511 A1* | 7/2004 | Sun et al. | 713/176 |
| 2005/0066172 A1* | 3/2005 | Vorbruggen et al. | 713/176 |
| 2005/0182939 A1* | 8/2005 | Yoshiura et al. | 713/176 |

FOREIGN PATENT DOCUMENTS

| | | |
|---|---|---|
| EP | 0 851 679 | 7/1998 |
| GB | 2 330 031 | 4/1999 |
| JP | 3106985 | 9/2000 |
| JP | 2001-78013 | 3/2001 |
| JP | 2002-132914 | 3/2001 |
| JP | 2002-232412 | 8/2002 |

\* cited by examiner

*Primary Examiner*—Matthew B Smithers
(74) *Attorney, Agent, or Firm*—Wenderoth, Lind & Ponack, L.L.P.

(57) ABSTRACT

A digital watermarking apparatus inputs video or audio information and embeds digital watermark in the information, which is capable of preventing digital watermark or set values necessary for digital watermarking operation from being altered. The apparatus includes a verifying section, a decrypting section and a watermarking section. The verifying section verifies encrypted set values using verification data in set values which is added with verification data and encrypted together with verification data, and transmits the verification result to the watermarking section. The verifying section also transmits the encrypted set values which are verified to the decrypting section. The decrypting section decrypts the encrypted set values. The watermarking section embeds digital watermark in the information using the decrypted and verified set values to output it, when a verification result from the verifying section is normal. When the verification result is not normal, the watermarking section does not output the input information to the outside of the apparatus.

12 Claims, 13 Drawing Sheets

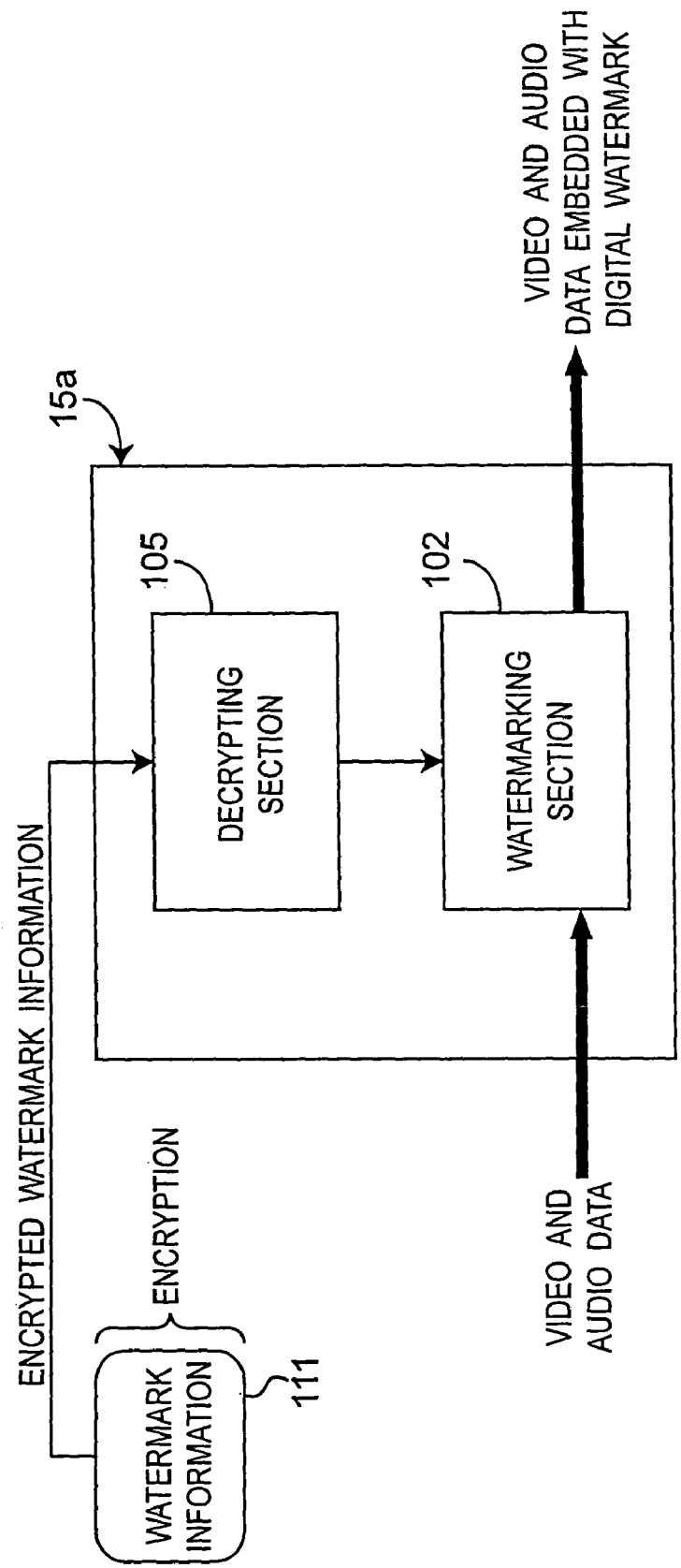

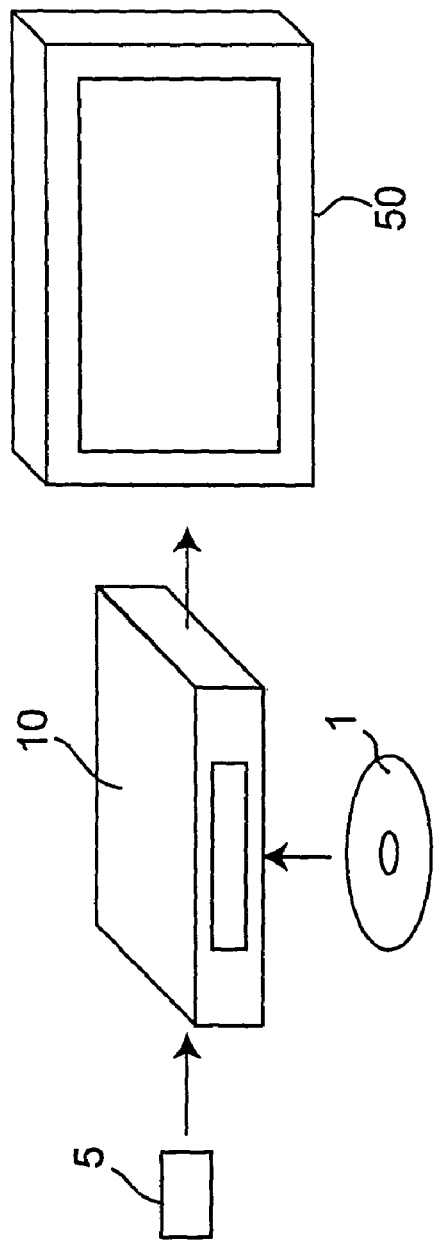
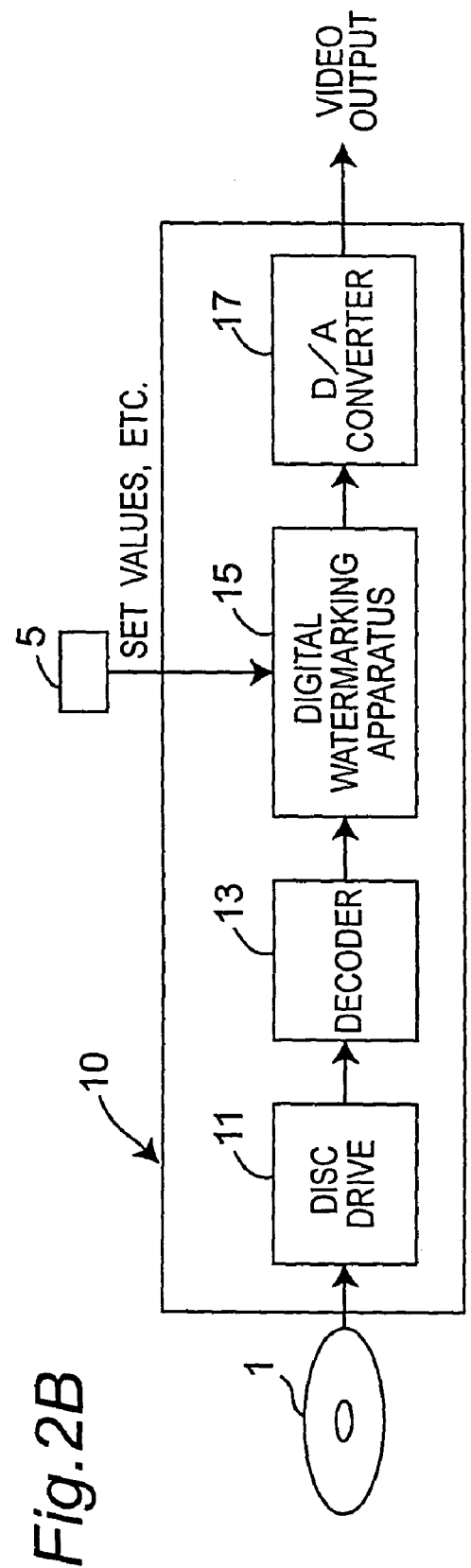
Fig.2A
Fig.2B

DIGITAL WATERMARKING APPARATUS AND APPLICATION APPARATUS USING THE SAME

BACKGROUND OF THE INVENTION

1. Field of the Invention

The present invention relates to a digital watermarking apparatus which embeds information relating to copyright protection in data such as video data or audio data, and an application apparatus using the digital watermarking apparatus.

2. Related Art

Recently, a digital versatile disc (DVD) has been remarkably wide-spread and a reproducing apparatus using the DVD has been introduced to an airplane or a museum.

Especially, for application in the airplane, since a film is sometimes shown before release in theaters, there is a strong demand for a system implementing the copyright protection such that contents such as the film before release will not leak out or even if it leaked, the source of the leaked contents can be tracked.

Conventionally, as a method of the copyright protection, there is a technique called "digital watermark" which embeds specific information in the contents such as video or audio (see Japanese Patent No. 3106985).

Information embedded as the digital watermark (referred to as "watermark information" hereinafter) include various kinds of information such as copy control information for limiting the number of copies of contents, IDs of contents, IDs of copyright owners or the like.

The watermark information mostly has an object for protecting the copyright of the contents. For example, if the copy control information is embedded in the contents, a reproducing apparatus detects the copy control information from the contents and can limit the copying operation by activating a copy preventing function. In addition, if the ID of the contents or the ID of the copyright owner are embedded, even if an illegal copy is made, the watermark information is detected from the contents and the copyright owner is certified according to detected numeral values or symbols, whereby the copyright of the contents can be claimed.

Thus, since the watermark information is for protecting the copyright of the contents, it is important that there is no error in the watermark information itself, that is, there is no error in numeral values and symbols to be embedded as the watermark information.

Furthermore, in order to correctly detect the watermark information from the contents, it is important that the apparatus for embedding the watermark information correctly embeds the watermark information in the contents according to a specific correct operating method or processing procedure.

As a technique for preventing the alteration of the watermark information embedded in the contents, there is a method in which the watermark information is encrypted and then embedded in the contents (see Japanese Patent Laid-Open Publication No. 2001-78013, and Japanese Patent Laid-Open Publication No. 2002-232412).

Once the watermark information is embedded in the contents, it is difficult to alter or remove it. However, it is relatively easy to alter the watermark information before it is embedded in the contents. In other words, according to the conventional digital watermarking apparatus, there is a problem in that the watermark information itself can be altered at a stage before the watermark information is embedded in the contents.

If the altered information is embedded in the contents, for example, the copy control information of the contents becomes numeral values or symbols which show that copying is possible at any number of times or the ID of the contents or the ID of the copyright owner becomes different from its original numeral values or the symbols so that the copyright owner cannot be certified, or the like. As a result, the right of the copyright owner is considerably damaged.

In addition, the digital watermarking apparatus often uses set values necessary for the embedding operation such as a mode designation value of the embedding operation, various kinds of constant values or variables used in the embedding operation, a comparative value, a table value, sign data or the like during the watermark embedding operation. It is not until these set values are correctly set that the digital watermarking apparatus can embed the watermark information in the contents according to the predetermined correct operating method or the processing procedure.

There is a possibility that the set values necessary for the embedding operation are altered when the watermark information is embedded in the contents. If the set values necessary for the watermark embedding operation are altered, the predetermined correct operational result cannot be obtained. As a result, signal strength of the watermark information to be embedded in the contents is reduced so that the watermark information can be easily removed, or the watermark information is embedded by a method or procedure different from that assumed by the apparatus on the side for detecting the digital watermark. Consequently, the watermark information cannot be detected from the contents.

SUMMARY OF THE INVENTION

In view of the above problems of the conventional digital watermarking apparatus, it is an object of the present invention to (i) correctly embed correct watermark information in content by protecting the watermark information, or (ii) correctly set values necessary to prevent the operation of the digital watermarking apparatus from being altered.

The first aspect of the invention includes a digital watermarking apparatus which inputs predetermined information and embeds a digital watermark in the predetermined information. The digital watermarking apparatus includes a verifying section, a decrypting section and a watermarking section. The verifying section inputs and verifies set value information. The set value information is provided by encrypting set values necessary for embedding the digital watermark and adding verification data to the encrypted set values. The decrypting section decrypts the encrypted set values in the set value information verified by the verifying section. When a verification result obtained by the information verifying section is normal, the watermarking section embeds digital watermark in the input predetermined information using the set values decrypted by the decrypting section to output the predetermined information embedded with the digital watermark. When the verification result is not normal, the watermarking section does not output the predetermined input information to the outside of the apparatus, or invalidates the predetermined input information to output the invalidated information.

The second aspect of the invention includes an another digital watermarking apparatus which inputs predetermined information and embeds a digital watermark in the predetermined information. The digital watermarking apparatus includes a decrypting section, a verifying section and a watermarking section. The decrypting section inputs and decrypts set value information. The set value information is provided by adding verification data to set values necessary for embedding the digital watermark and encrypting at least a part of the set values added with the verification data. The verifying section verifies the set values with the verification data in the set value information decrypted by the decrypting section. When a verification result from the verifying section shows normal, the watermarking section obtains the verified set values from the verifying section, embeds the digital watermark in the input predetermined information using the obtained set values and outputs the predetermined information embedded with the digital watermark. When the verification result is not normal, the watermarking section does not output the input predetermined information to the outside of the apparatus.

The third aspect of the invention includes an application apparatus including a reproducing section that reproduces predetermined information stored in a recording medium and the digital watermarking apparatus according to the present invention that inputs the predetermined information reproduced by the reproducing section and embeds the digital watermark in the predetermined information. The reproducing section inputs a verification result from the verifying section in the digital watermarking apparatus. When the verification result is normal, the reproducing section performs a reproducing operation. When the verification result is not normal, the reproducing section does not perform the reproducing operation or the digital watermarking apparatus invalidates an output of the reproducing section.

The fourth aspect of the invention includes an application apparatus including a receiving and a decoding section that receives predetermined information through a communication medium and decodes the received information. Further, the digital watermarking apparatus according to the present invention inputs the information received and decoded by the receiving and decoding section and embeds the digital watermark in the predetermined information. The receiving and decoding section inputs a verification result from the verifying section in the digital watermarking apparatus. When the verification result is normal, the receiving and decoding section performs receiving and decoding operations. When the verification result is not normal, the receiving and decoding section does not perform at least one of receiving operation and decoding operation or the digital watermarking apparatus invalidates an output of the receiving and decoding section.

The fifth aspect of the invention includes an application apparatus including the digital watermarking apparatus and a recording section that inputs information output from the digital watermarking apparatus and records the information in a recording medium. The recording section receives a verification result from the verification section in the digital watermarking apparatus. When the verification result is normal, the recording section records the information output from the digital watermarking apparatus. When the verification result is not normal, the recording section does not perform recording operation or invalidates the information output from the digital watermarking apparatus and then records the invalidated information.

A sixth aspect of the invention includes an application apparatus including the digital watermarking apparatus according to the present invention and an encoding and transmitting section that encodes information output from the digital watermarking apparatus and transmits the encoded information through a communication medium. The encoding and transmitting section inputs a verification result of the verifying section in the digital watermarking apparatus. When the verification result is normal, the encoding and transmitting section performs the encoding and transmitting operations. When the verification result is not normal, the encoding and transmitting section does not perform at least one of the encoding and transmitting operations or invalidates the information output from the digital watermarking apparatus and then performs the encoding and transmitting operations.

BRIEF DESCRIPTION OF THE DRAWINGS

FIG. 1 is a block diagram of a digital watermarking apparatus according to a first embodiment of the present invention;

FIG. 2A is a view showing an example configuration of a system including a reproducing apparatus which uses the digital watermarking apparatus according to the present invention;

FIG. 2B is a block diagram of the reproducing apparatus;

DESCRIPTION OF THE INVENTION

Figure 3:
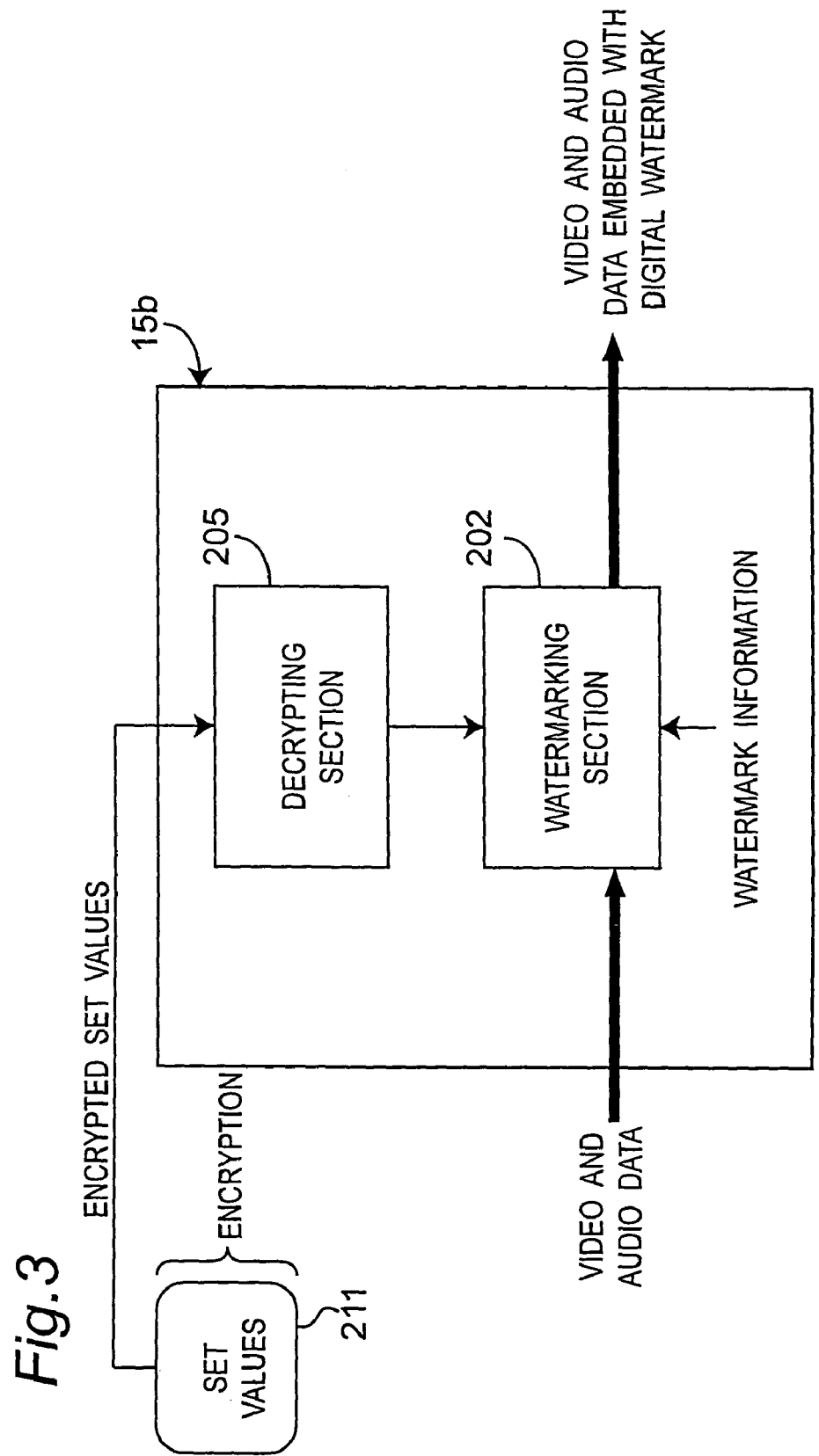
FIG. 3 is a block diagram of a digital watermarking apparatus according to a second embodiment of the present invention.

Hereinafter, a description will be made of embodiments of a digital watermarking apparatus and an applied apparatus using the same with reference to the accompanying drawings.

First Embodiment

FIG. 1 illustrates an example of a configuration of a digital watermarking apparatus according to the present invention. A digital watermarking apparatus 15a is an apparatus for embedding digital watermark information in video and audio data for copyright protection, and includes a watermarking section 102 and a decrypting section 105.

Hereinafter, a description will be made of an example of a system including a reproducing apparatus using the digital watermarking apparatus which will be described in this and other embodiments of the present invention.

FIG. 2A illustrates an example of a system configuration. The system includes a disc reproducing apparatus 10 and display 50. The disc reproducing apparatus 10 reproduces a disc medium 1 to output video or audio, and especially needs information recorded in an information recording medium 5 for achieving data reproduction with the copyright protection.

The information recording medium 5 includes for example an IC card, and stores key information necessary for reproducing the disc medium 1, information necessary for digital watermark embedding operation, or the like. The information is encrypted or added with electronic signature, and then stored. The information necessary for the digital watermark embedding operation includes (i) encrypted watermark information or set values, (ii) watermark information or set values to which verification data is applied, (iii) encrypted watermark information or set values to which the verification data is applied, or (iv) watermark information or set values to which encrypted verification data is applied in the embodiments according to this invention.

The disc medium 1 stores video or audio information. The information recording medium 5 needs to be inserted in the disc reproducing apparatus 10 because the information recorded in the information recording medium 5 is used when the disc medium 1 is reproduced. In other words, the disc reproducing apparatus 10 can reproduce the disc medium 1 only when the information recording medium 5 is inserted.

FIG. 2B illustrates a configuration of the disc reproducing apparatus 10. The disc reproducing apparatus 10 includes a disc drive 11, a decoder 13, a digital watermarking apparatus 15 and a D/A converter 17. The digital watermarking apparatus 15 may be any one of the digital watermarking apparatuses 15a to 15h in the embodiments described herein.

The disc drive 11 reads data recorded in the disc medium 1. The read signal is decoded by the decoder 13. The decoded signal is embedded with watermark information by the digital watermarking apparatus 15 and is converted to an analog signal at the D/A converter 17 to become a video output.

The digital watermarking apparatus 15 reads information necessary for embedding the watermark information from the information recording medium 5, and embeds the watermark information in the video or audio signal reproduced from the disc medium 1 using the read information.

Referring to FIG. 1 again, the digital watermarking apparatus 15a according to this embodiment of the present invention will be described in detail. Encrypted watermark information 111 is input to the digital watermarking apparatus 15a. The input encrypted watermark information 111 is decrypted at the decrypting section 105. The watermark information includes various kinds of information such as copy control information or an ID relating to video and audio data, or an ID for the copyright owner or the like. The watermark information is obtained by representing the above information in numeral values or symbols. The encryption key used when the decrypting section 105 decrypts the cipher may be previously stored in the digital watermarking apparatus 15a or may be provided from the outside of the digital watermarking apparatus 15a.

The watermark information decrypted at the decrypting section 105 is transmitted to the watermarking section 102. The watermarking section 102 inputs video and audio data, embeds the watermark information decrypted by the decrypting section 105 in the video and audio data and outputs it. A method of watermarking or embedding the watermark information at the watermarking section 102 may be any one of well-known digital watermarking techniques.

As described above, according to this embodiment, the watermark information to be embedded in the video and audio data is input to the apparatus in an encrypted state. The encrypted watermark information is an encrypted text which is meaningless according to the state of the numeral values or symbols, and thus it is difficult to alter the encrypted text to be decrypted to an intended value. Therefore, it is possible to keep confidential the value of the watermark information embedded in the video or audio data from the outside of the apparatus. Furthermore, altering the watermark information to the intended value can be prevented.

Although the encrypted watermark information is decrypted by the decrypting section 105 and then embedded in the video and audio data according to this embodiment of the present invention, as another configuration, the encrypted watermark information may be embedded in the video and audio data without being decrypted. In this case, according to FIG. 1, the decrypting section 105 is unnecessary and the encrypted watermark information is directly input into the watermarking section 102. According to this configuration, since the watermark information is embedded in the video and audio data in the encrypted state, the decrypting means is provided at an apparatus on the side for detecting the watermark information, whereby the detected watermark information can be decrypted. Thus, since the encrypted watermark information is embedded in the video and audio data, confidentiality is further improved.

Second Embodiment

FIG. 3 illustrates a digital watermarking apparatus according to a second embodiment of the present invention. The digital watermarking apparatus 15b includes a watermarking section 202 and a decrypting section 205.

The digital watermarking apparatus 15b according to this embodiment inputs encrypted set values 211. The set values are data that is necessary for embedding the watermark information by the watermarking section 202. The set values necessary for the embedding operation include the following values, for example:

A set value for selecting doing or not doing the embedding operation;

A set value of a mode, that is, the value to select one of methods and modes in a case where the watermarking section 202 has a plurality of embedding methods and modes;

A constant or variable used in an embedding operation;

A comparative value or table value used in an embedding operation;

Sign data used in an embedding operation;

A designation value of strength of an embedding signal;

A designation value of a place or timing for embedding the watermark in the video or audio data; and Other various kinds of values necessary for operation of the watermarking section 202.

The above encrypted set values 211 are input to the digital watermarking apparatus 15b and decrypted at the decrypting section 205. The set values decrypted at the decrypting section 205 are transmitted to the watermarking section 202. The watermarking section 202 inputs the video and audio data, embeds the watermark information in the video and audio data, and outputs it. At this time, the embedding operation is performed using the set values decrypted at the decrypting section 205 or according to the decrypted set values.

As described above, according to this embodiment of the present invention, the set values necessary for the operation of the watermarking section 202 are input to the apparatus in the encrypted state. The encrypted set values are an encrypted text which cannot be understood from the numeral values or the symbols, and it is difficult to alter the encrypted text to be decoded to the intended values. Therefore, it is possible to keep confidential what kind of set values the watermarking section 202 uses from the outside of the apparatus. Furthermore, conduct which alters the set values at the watermarking section to the intended values can be prevented.

Third Embodiment

Figure 4:
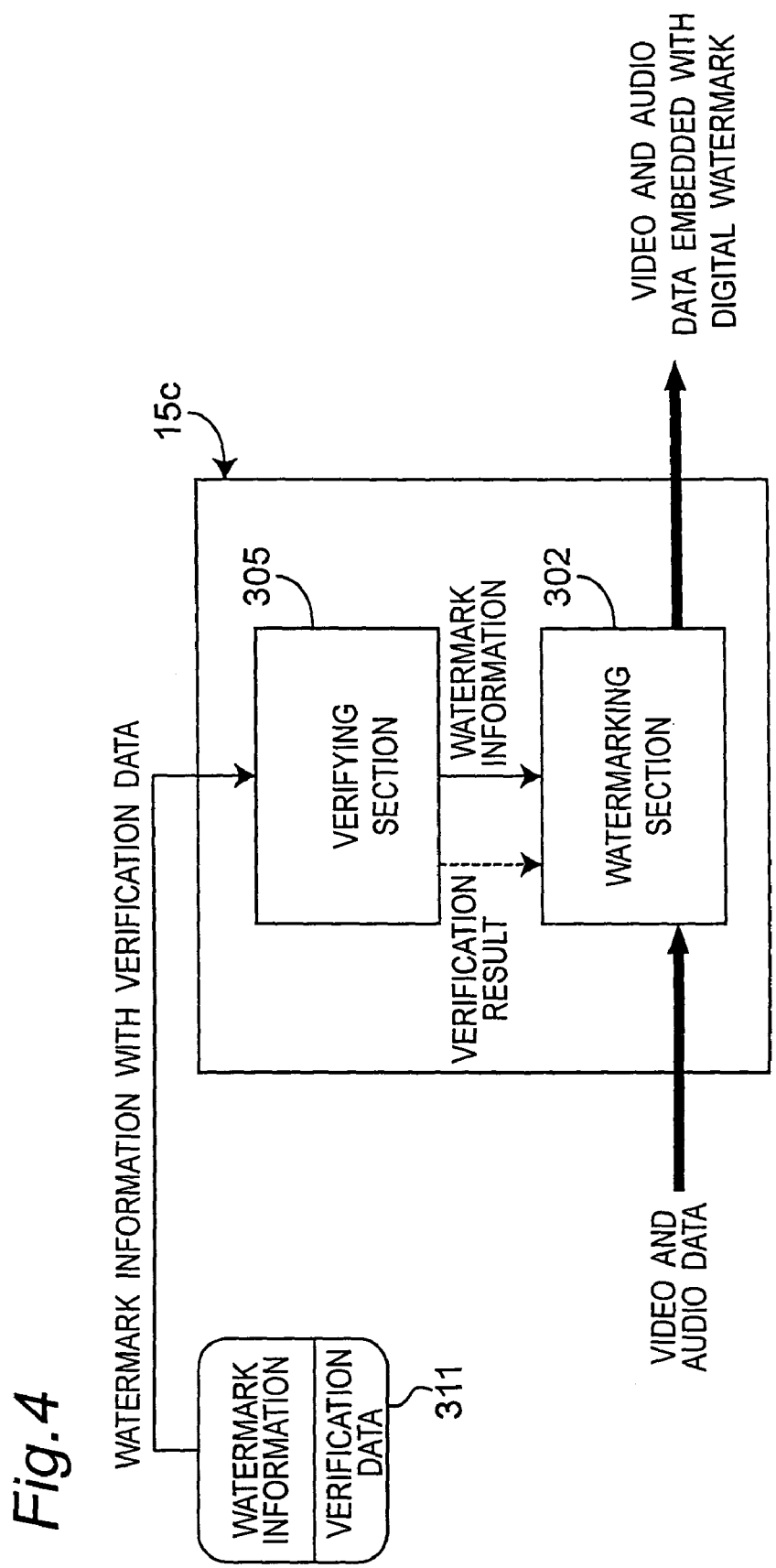
FIG. 4 is a block diagram of a digital watermarking apparatus according to a third embodiment of the present invention.

FIG. 4 illustrates a digital watermarking apparatus according to a third embodiment of the present invention. A digital watermarking apparatus 15c includes a watermarking section 302 and a verifying section 305.

The digital watermarking apparatus 15c according to this embodiment inputs watermark information 311 and verification data. The watermark information 311 is provided by adding verification data for detecting an error of the watermark information to the watermark information.

Here, as means for detecting the error, various kinds of error detecting methods and error detecting symbols such as parity check, CRC (Cyclic Redundancy Check) are well known. In order to prevent the watermark information from being altered, its error detecting method or operational expression are better to not be analogized. In order to further increase security to the altering conduct, as the verification data added to the watermark information, electronic signature using public key encryption may be used. In this case, a public key necessary for verifying the signature may be previously stored in the digital watermarking apparatus 15c or may be provided from the outside of the digital watermarking apparatus. In addition, other detecting means may be used.

The verifying section 305 is implemented with a predetermined error detecting function or a verifying function and verifies the watermark information using the verification data in the input watermark information 311 and verification data. When the verifying section 305 completes the verifying operation, the verification result (information showing presence or absence of the error in the input watermark information) is transmitted to the watermarking section 302.

Referring to the verification result transmitted from the verifying section 305, when there is no error, the watermarking section 302 obtains the verified watermark information from the verifying section 305, embeds the watermark information in the input video and audio data, and outputs it to the outside of the apparatus 15c.

Otherwise, when the verification result from the verifying section 305 shows the error, the watermarking section 302 does not output the input video and audio data to the outside of the apparatus 15c. At this time, instead of not outputting the video and audio data to the outside of the apparatus, the watermarking section 302 may invalidate the video and audio data so that they are hardly viewed or heard (i.e., scrambled) and output invalidated data, or output dummy data.

Thus, according to this embodiment of the present invention, the watermark information, to be embedded in the video and audio data, is input to the apparatus under the condition that the verification data is added. Thus, even if the input watermark information is altered, since the verification data is added, the altering conduct to the watermark information can be detected as the error by the verifying section. When the error is detected, the watermarking section 302 does not output the video and audio data to the outside of the apparatus so that the video and audio data cannot be viewed or heard. Therefore, the altering conduct to the watermark information can be prevented.

Fourth Embodiment

Figure 5:
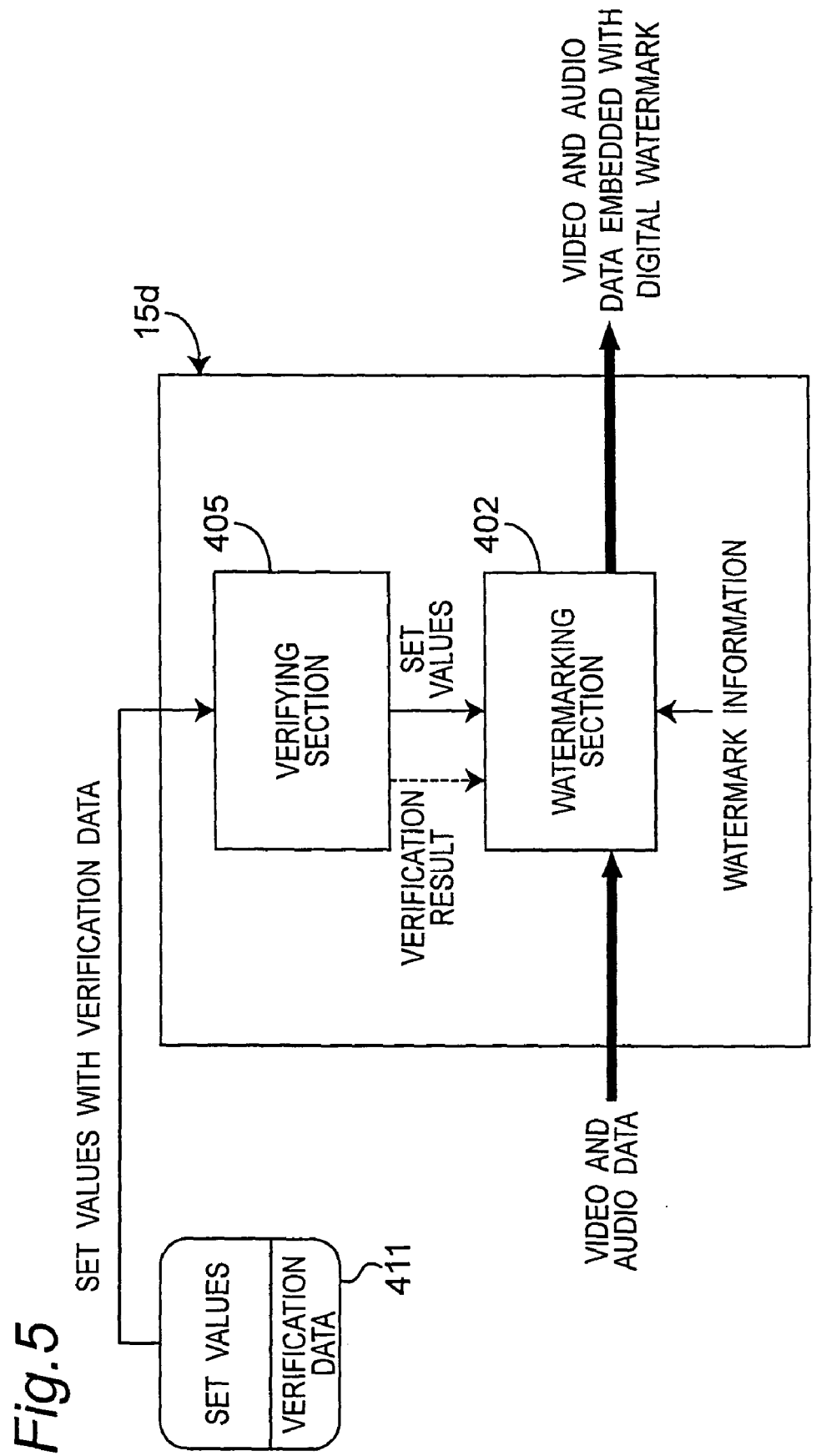
FIG. 5 is a block diagram of a digital watermarking apparatus according to a fourth embodiment of the present invention.

FIG. 5 illustrates a digital watermarking apparatus according to a fourth embodiment of the present invention. A digital watermarking apparatus 15d includes a watermarking section 402 and a verifying section 405.

The digital watermarking apparatus 15d of this embodiment inputs set values 411 with the verification data. The values 411 are provided by adding verification data for detecting an error of the set values to the set values necessary for the embedding operation of the watermarking section 402. The set values and verification data are the same as those described in the second and third embodiments of the present invention.

The verifying section 405 verifies the set values using verification data in the set values 411 with the verification data and transmits the verification result to the watermarking section 402.

The watermarking section 402 refers to the verification result transmitted from the verifying section 405 and when there is no error, the watermarking section 402 obtains the verified set values from the verifying section 405. Then, the watermarking section 402 embeds the watermark information in the input video and audio data. At this time, the watermarking section 402 performs the embedding operation using the verified set value or according to the values of the verified set values, and outputs the video and audio data with the embedded watermark information to the outside.

Otherwise, if the verification result transmitted from the verifying section 405 shows the error, the watermarking section 402 does not output the input video and audio data to the outside of the apparatus. At this time, instead of not outputting the video and audio data to the outside of the apparatus, the watermarking section 402 may invalidate the video and audio data so that they are hardly viewed or heard (i.e., scrambled) and output the invalidated data, or output dummy data.

Thus, according to this embodiment, the verification data is added to the set values necessary for the operation of the watermarking section 402 and input to the apparatus. Thus, even if the set value is altered, since the verification data is added, the altering conduct to the set values is detected as the error in the verifying section. When the error is detected, the watermarking section does not output the video and audio data to the outside of the apparatus, and thus the video and audio data cannot be viewed or heard. Therefore, the altering conduct to the set values necessary for the operation of the watermarking section can be prevented.

Fifth Embodiment

Figure 6:
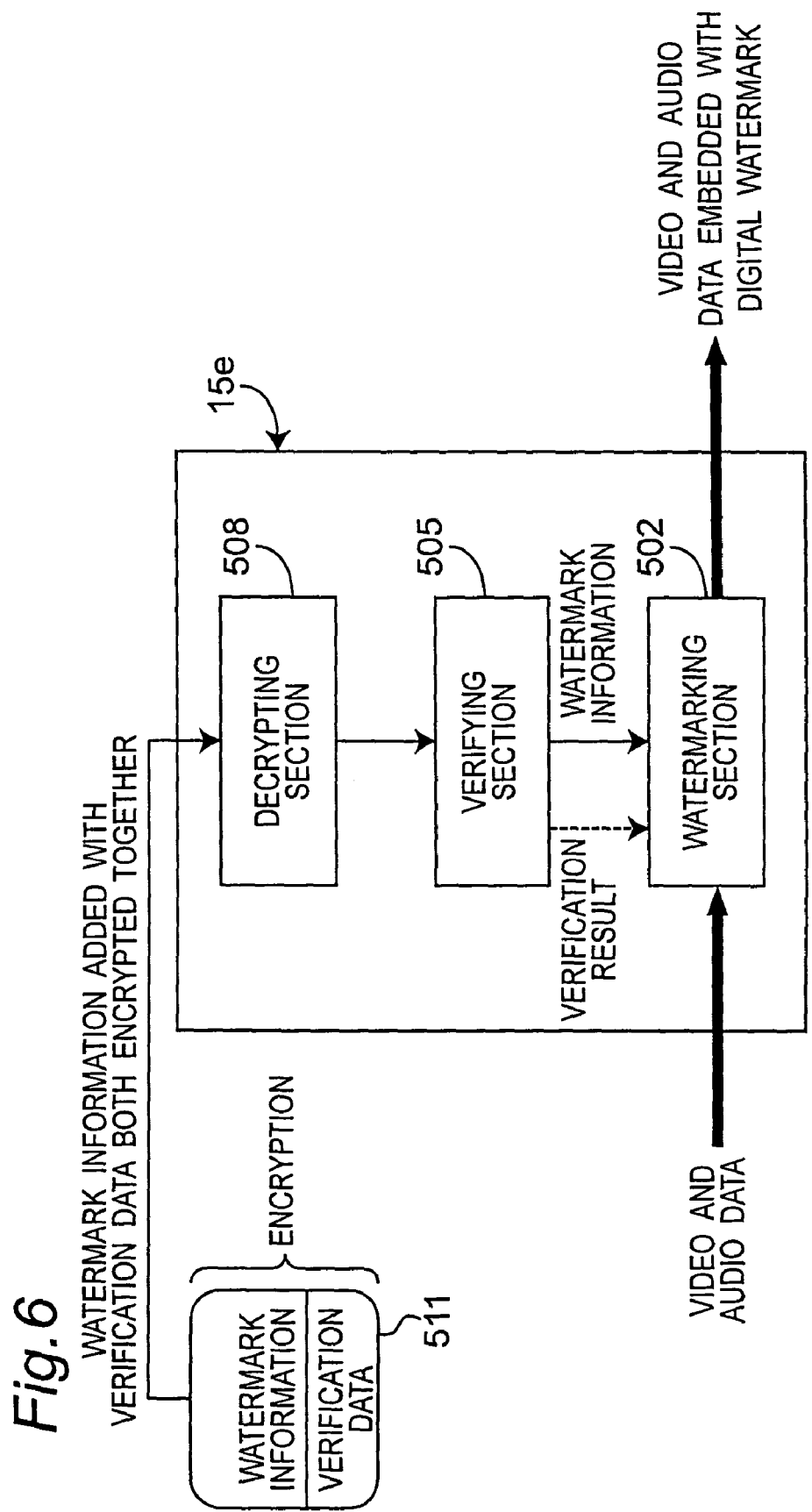
FIG. 6 is a block diagram of a digital watermarking apparatus according to a fifth embodiment of the present invention.

FIG. 6 illustrates a digital watermarking apparatus according to a fifth embodiment of the present invention. A digital watermarking apparatus 15e includes a watermarking section 502, a verifying section 505 and a decrypting section 508.

The digital watermarking apparatus 15e according to this embodiment inputs watermark information 511 and verification data encrypted together. The watermark information 511 is provided by adding the verification data relating to the watermark information to the watermark information and then encrypting a part or whole of the verification data and the watermark information. Here, the verification data means data added to detect an error of the watermark information and it is the same as that described in the third embodiment of the present invention.

The decrypting section 508 decrypts the watermark information 511 with the encrypted verification data and transmits the watermark information with the decrypted verification data to the verifying section 505. The watermark information and the corresponding decrypted verification data is data in which the cipher of the watermark information 511 with the encrypted verification data is decrypted and includes the watermark information and the verification data.

The verifying section 505 verifies the watermark information with the decrypted verification data and transmits the verification result to the watermarking section 502.

The watermarking section 502 refers to the verification result transmitted from the verifying section 505 and when there is no error, it obtains the verified watermark information from the verifying section 505. Then, the watermarking section 502 embeds the watermark information in the input video and audio data and outputs the video and audio data embedded with the watermark information, to the outside.

Otherwise, if the verification result transmitted from the verifying section 505 shows an error, the watermarking section 502 does not output the input video and audio data to the outside of the apparatus 15e. At this time, the watermarking section 502 may invalidate the video and audio data so that they are hardly viewed or heard (i.e., scrambled) and output it, or may output dummy data instead of not outputting the video and audio data to the outside of the apparatus.

Thus, according to this embodiment, the verification data is added to the watermark information to be embedded in the video and audio data and input to the apparatus under the condition that at least a part of it is encrypted. Thus, since the encrypted information is meaningless in a state of the numeral values or symbols, it is possible to keep confidential what kind of numeral values or symbols are embedded as the watermark information from the outside of the apparatus. Furthermore, it is difficult to alter the encrypted text so as to decode it to an intended value. In addition, even if the encrypted text is altered to any numeral numbers or symbols, since the verification data is added, the altering conduct to the watermark information is detected in the verifying section as the error. When the error is detected, since the watermarking section does not output the video and audio data to the outside of the apparatus, the video and audio data cannot be viewed or heard. Therefore, it is possible to keep the watermark information confidential from the outside of the apparatus. Furthermore, it is possible to prevent the conduct altering the watermark information to any numeral values by combination with the verifying section and the watermarking section.

Sixth Embodiment

Figure 7:
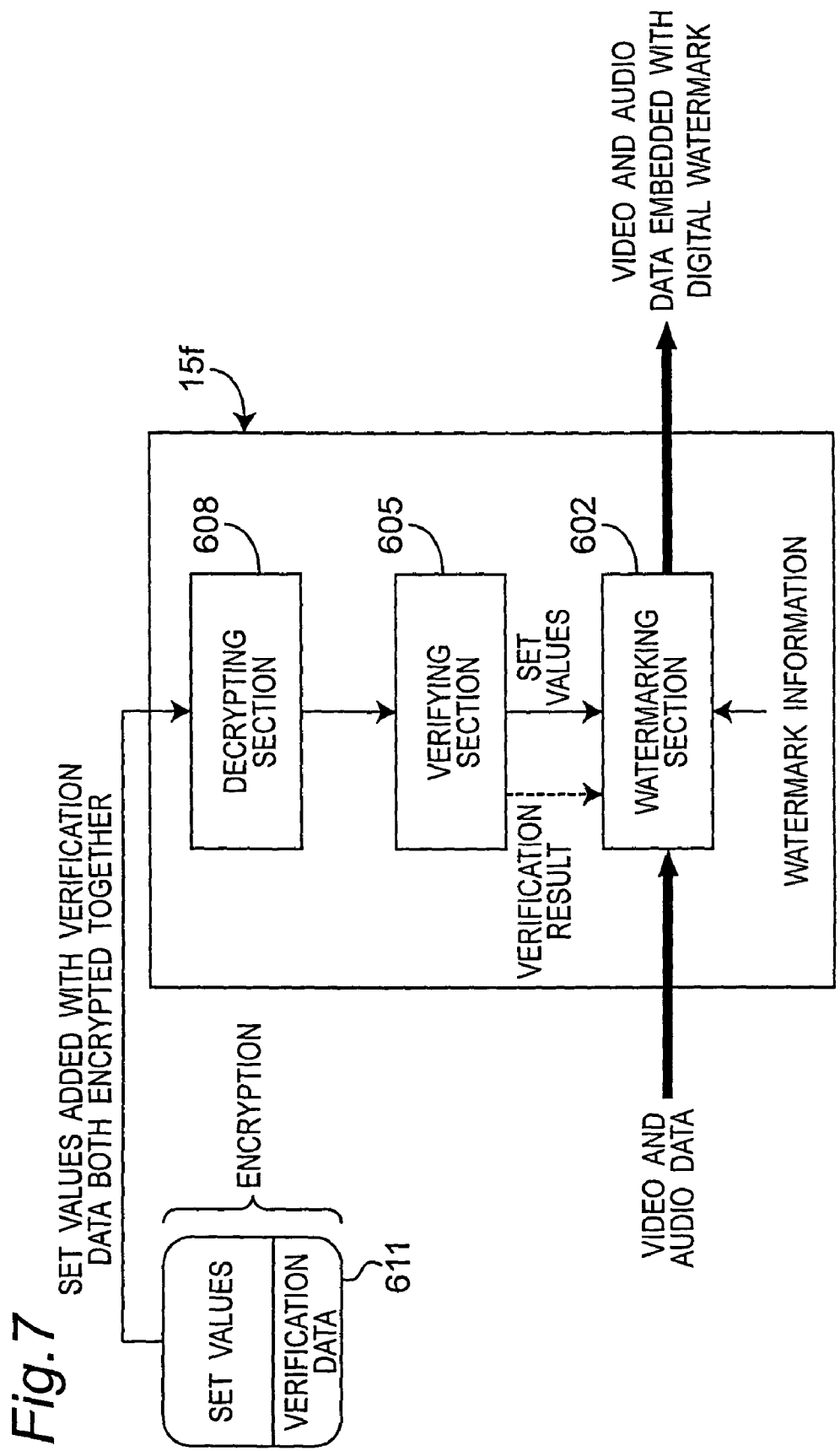
FIG. 7 is a block diagram of a digital watermarking apparatus according to a sixth embodiment of the present invention.

FIG. 7 illustrates a digital watermarking apparatus according to a sixth embodiment of the present invention. A digital watermarking apparatus 15f includes a watermarking section 602, a verifying section 605 and a decrypting section 608.

The digital watermarking apparatus 15f according to this embodiment inputs set values 611 and verification data both encrypted together. The set values 611 are provided by adding the verification data to the set values and then encrypting a part or whole of the set values and the verification data. Here, the verification data and the set value are the same as that described in the third and second embodiments of the present invention.

The decrypting section 608 decrypts set values 611 encrypted together with verification data, and transmits the decrypted set values with the verification data to the verifying section 605. The decrypted set values with the verification data is data in which the cipher of the set values 611 is decrypted and includes the decrypted set values and the decrypted verification data.

The verifying section 605 verifies presence or absence of an error in the decrypted set values using the verification data and transmits the verification result to the watermarking section 602.

The watermarking section 602 refers to the verification result transmitted from the verifying section 605 and when there is no error, it obtains the verified set values from the verifying section 605. Then, the watermarking section 602 embeds the watermark information in the input video and audio data. At this time, the watermarking section 602 performs embedding operation using the verified set vales or according to the values of the verified set values and outputs the video and audio data embedded with the watermark information to the outside of the apparatus.

Otherwise, if the verification result from the verifying section 605 shows the error, the watermarking section 602 does not output the input video and audio data to the outside of the apparatus. At this time, the watermarking section 602 may invalidate the video and audio data so that they are hardly viewed or heard (i.e., scrambled) and outputs it, or may output dummy data, instead of not outputting the video and audio data to the outside of the apparatus.

Thus, according to this embodiment of the present invention, the set values necessary for the operation of the watermarking section 602 is added with the verification data and then input to the apparatus under the condition that at least a part or whole thereof is encrypted. Thus, since the encrypted information is meaningless in a state of the numeral values or symbols, it is possible to keep confidential what kind of numeral values or symbols are used in the operation of the watermarking section from the outside of the apparatus. Furthermore, since it is difficult to alter the encrypted text so as to decode it to intended values, the set values are prevented from being altered to the intended value. In addition, even if the encrypted text is altered to any numeral numbers or symbols, since the verification data is added, the altering conduct to the set values is detected in the verifying section as the error. When the error is detected, since the watermarking section will not output the video and audio data to the outside of the apparatus, the video and audio data cannot be viewed or heard. Therefore, it is possible to keep the set values confidential from the outside of the apparatus. Furthermore, it is possible to prevent alteration of the set values to any numeral values by combination with the verifying section and the watermarking section.

Seventh Embodiment

Figure 8:
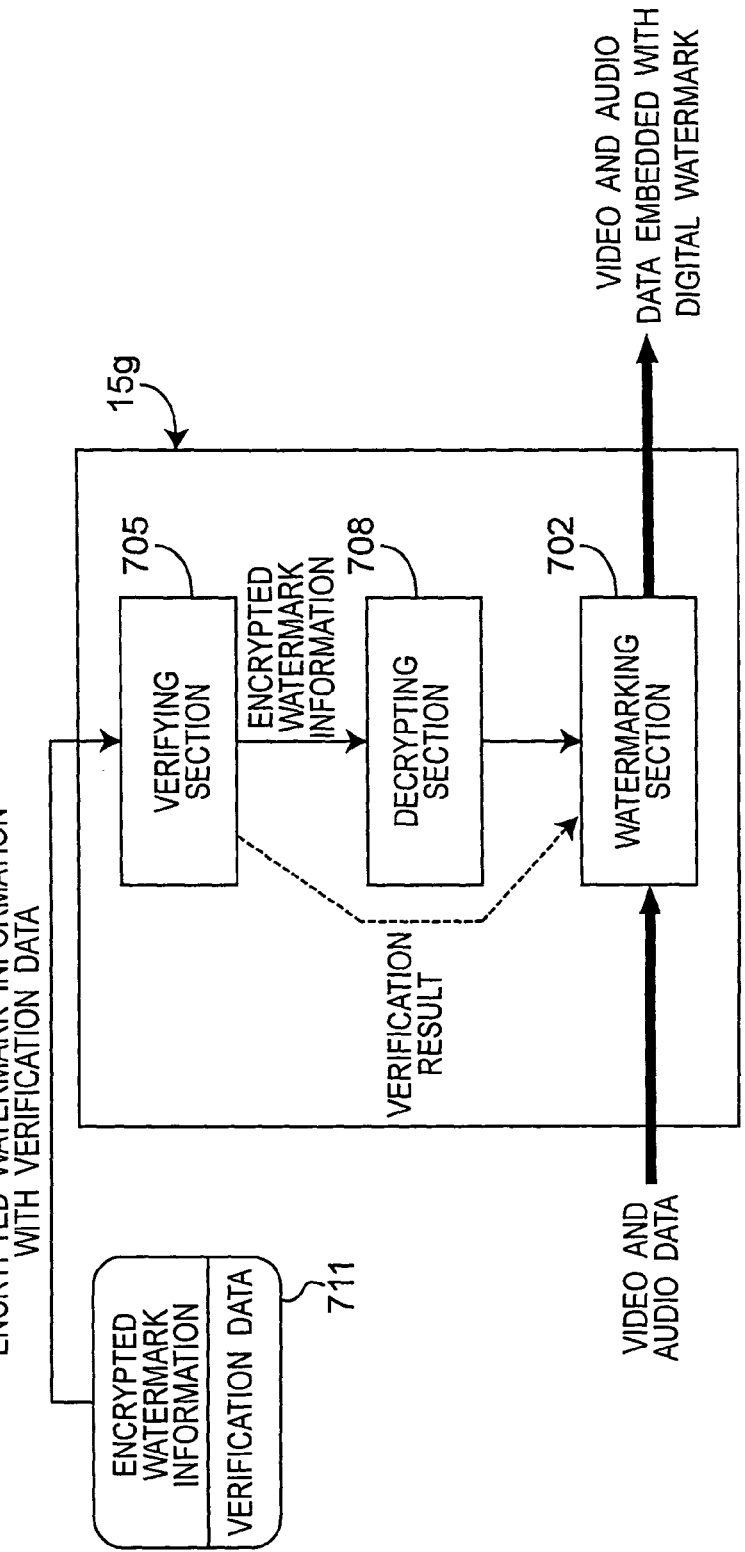
FIG. 8 is a block diagram of a digital watermarking apparatus according to a seventh embodiment of the present invention.

FIG. 8 illustrates a digital watermarking apparatus according to a seventh embodiment of the present invention. A digital watermarking apparatus 15g includes a watermarking section 702, a verifying section 705 and a decrypting section 708.

The digital watermarking apparatus 15g according to this embodiment inputs encrypted watermark information 711 with the verification data. The information 711 is provided by adding the verification data to the encrypted watermark information. Here, the verification data means the data added to detect an error of the encrypted watermark information and it is the same as that described in the third embodiment of the present invention.

The verifying section 705 verifies the encrypted watermark information using the verification data included in the encrypted watermark information 711 with the verification data, and transmits the verification result to the watermarking section 702.

The verifying section 705 also transmits the encrypted watermark information to the decrypting section 708. The decrypting section 708 decrypts the encrypted watermark information from the verifying section 705.

The watermarking section 702 refers to the verification result transmitted from the verifying section 705, and when there is no error, it obtains the decrypted watermark information from the decrypting section 708.

As described above, the watermarking section 702 performs the operation for obtaining the decrypted watermark information after the operation at the decoder 708 only when the verification result shows that there is no error. This is preferable since an unnecessary operation can be reduced. The reason is that in a case where the verification result shows an error, since there is a possibility that the error is generated in the verified encrypted watermark information or the decrypted watermark information, the information is not used as the watermark information, and in this case the decrypting operation in the decrypting section 708 can be wasted. It should be noted that, in addition, regardless of the verification result, the watermarking section 702 may always acquire the decrypted watermark information after the operation at the decrypting section 708.

The watermarking section 702 refers to the verification result transmitted from the verifying section 705, and when there is no error, it embeds the decrypted watermark information in the input video and audio data and outputs the video and audio data embedded with the watermark information, to the outside of the apparatus.

Otherwise, if the verification result transmitted from the verifying section 705 shows the error, the watermarking section 702 does not output the input video and audio data to the outside of the apparatus. At this time, the watermarking section 702 may invalidate the video and audio data so that they are hardly viewed or heard (i.e., scrambled) and then output, or may output dummy data, instead of not outputting the video and audio data to the outside of the apparatus.

Thus, according to this embodiment of the present invention, the watermark information to be embedded in the video and audio data is encrypted, added with the verification data, and then input to the apparatus. Thus, since the encrypted information is meaningless in a state of the numeral values or symbols, it is possible to keep confidential what kind of numeral values or symbols are embedded as the watermark information from the outside of the apparatus. Furthermore, it is difficult to alter the encrypted text so as to decode it to an intended value. In addition, even if the encrypted text is altered to any numeral numbers or symbols, the altering conduct to the watermark information can be detected as the error in the verifying section since the verification data is added. When the error is detected, the watermarking section does not output the video and audio data to the outside of the apparatus, and thus the video and audio data cannot be viewed or heard. Furthermore, since the operation of the verifying section is performed before the decrypting section, the alteration of the watermark information can be immediately detected.

As described above, it is possible to keep the watermark information confidential from the outside of the apparatus. Furthermore, it is possible to prevent the conduct altering the watermark information to any numeral values by combination with the watermarking section and the verifying section and it is possible to detect the alteration of the watermark information for a short time.

According to this embodiment of the present invention, although the verified encrypted watermark information from the verifying section 705 is embedded in the video and audio data after decrypted at the decrypting section 708, as another configuration, the verified encrypted watermark information may be embedded in the video and audio data without decrypting operation. In this case, the decrypting section 708 is not necessary in FIG. 8 and the verified encrypted watermark information from the verifying section 705 is directly input to the watermarking section 702. According to this configuration, since the watermark information is embedded in the video or audio data in an encrypted state, the decrypting means has to be provided in an apparatus on the side where the watermark information is detected. This enables the detected watermark information to be decrypted. Thus, since the watermark information is embedded in the video or the audio data in the encrypted state, the confidentiality of the watermark information can be further improved.

Eighth Embodiment

Figure 9:
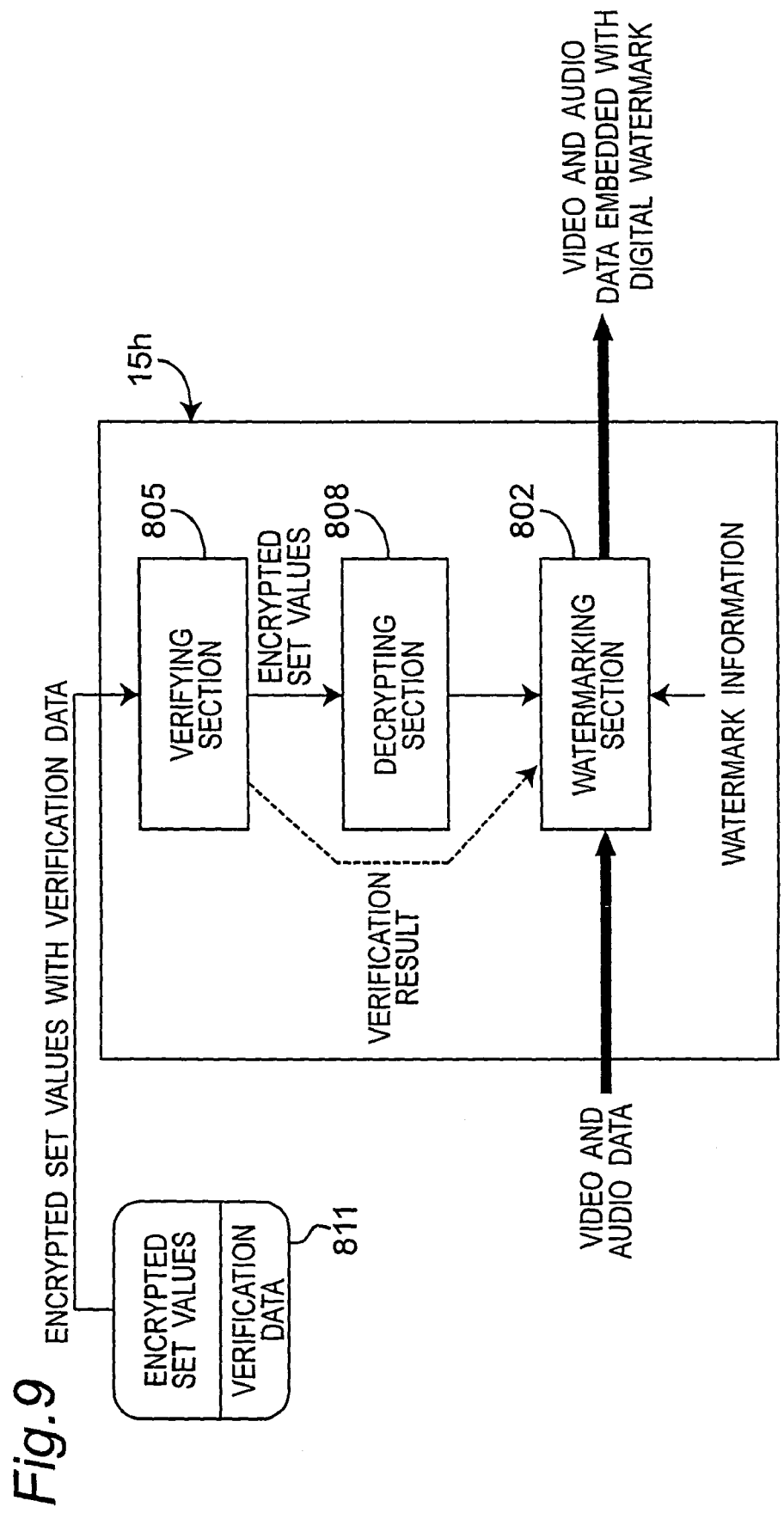
FIG. 9 is a block diagram of a digital watermarking apparatus according to an eighth embodiment of the present invention.

FIG. 9 illustrates a digital watermarking apparatus according to an eighth embodiment of the present invention. A digital watermarking apparatus 15h includes a watermarking section 802, a verifying section 805 and a decrypting section 808.

The digital watermarking apparatus 15h according to this embodiment inputs encrypted set values 811 with verification data. The set values 811 are provided by encrypting set values and adding the verification data to the encrypted set values. Here, the verification data and the set values are the same as those described in the third and second embodiments of the present invention, respectively.

The verifying section 805 verifies the encrypted set values using the verification data included in the encrypted set values 811 with the verification data and transmits the verification result to the watermarking section 802. The verifying section 805 also transmits the verified and encrypted set values to the decrypting section 808. The decrypting section 808 decrypts the encrypted set values.

The watermarking section 802 refers to the verification result transmitted from the verifying section 805 and when there is no error, it obtains the decrypted set values from the decrypting section 808.

As described above, since the watermarking section 802 performs the operation for obtaining the decrypted set values after the operation at the decrypting section 808 only when the verification result shows that there is no error. This is preferable since an unnecessary operation is reduced.

The reason is that if the verification result shows an error, there is a possibility that the error is generated in the verified encrypted set values or the decrypted set values and the information may not be used as the set values and in this case, and thus the decoding operation at the decoder 808 may be wasted. In addition, regardless of the verification result, the watermarking section 802 may always obtain the decrypted set values after the operation at the decrypting section 808.

The watermarking section 802 embeds the watermark information in the input video and audio data when the verification result transmitted from the verifying section 805 shows no error. At this time, the watermarking section 802 performs the embedding operation using the decrypted set values or according to the values of the decrypted set values and outputs the video and audio data embedded with the watermark information to the outside of the apparatus.

Otherwise, if the verification result from the verifying section 805 shows an error, the watermarking section 802 forbids to output the video and audio data input to the watermarking section 802 to the outside. At this time, the watermarking section 802 may invalidate the video and audio data so that they are hardly viewed or heard and output the invalidated data, or may output dummy data instead of not outputting the video and audio data 803 to the outside of the apparatus.

Thus, according to this embodiment of the present invention, the set values necessary for the operation of the watermarking section are encrypted, added with the verification data, and then input to the apparatus. Thus, since the encrypted information is meaningless in a state of the numeral values or symbols, it is possible to keep confidential what kind of numeral values or symbols are used in the operation of the watermarking section from the outside of the apparatus. Furthermore, since it is difficult to alter the encrypted text so as to decode it to intended values, the set values are prevented from being altered to the intended value. In addition, even if the encrypted text is altered to any numeral numbers or symbols, since the verification data is added, the altering conduct to the watermark information is detected as the error in the verifying section. When the error is detected, since the watermarking section does not output the video and audio data to the outside of the apparatus, the video and audio data cannot be viewed or heard. Furthermore, since the operation at the verifying section is performed before the decrypting section, the alteration of the set values can be immediately detected.

As described above, it is possible to keep the set values confidential from the outside of the apparatus. Furthermore, it is possible to prevent the conduct altering the set values to any numeral values by combination with the verifying section and the watermarking section and it is possible to detect the alteration of the set values for a short time.

Ninth Embodiment

Figure 10:
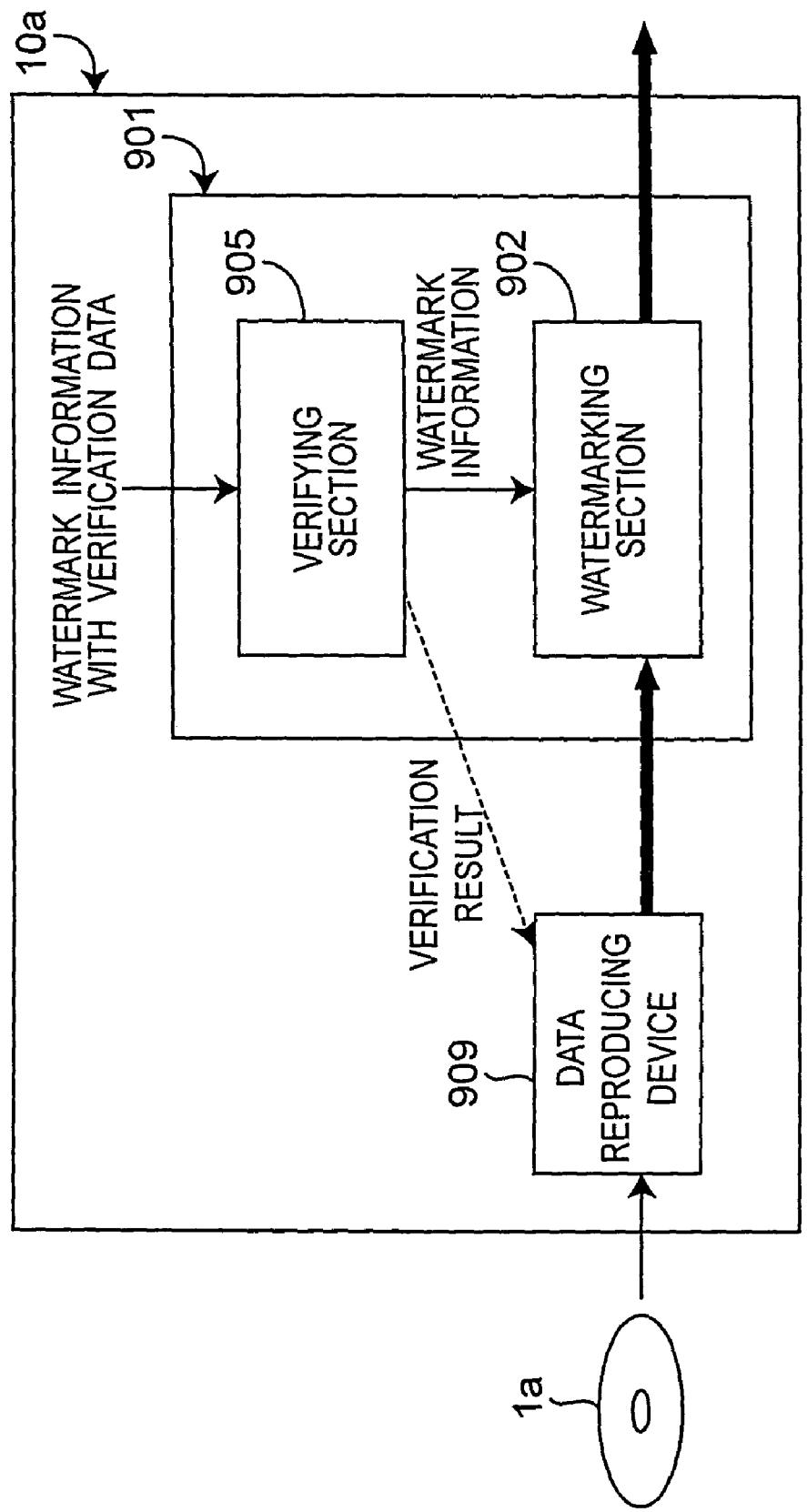
FIG. 10 is a view showing a configuration of an information reproducing apparatus using the digital watermarking apparatus according to the present invention.

FIG. 10 illustrates a configuration of an information reproducing apparatus which is one of applied devices using the above digital watermarking apparatus. An information reproducing apparatus 10a includes a data reproducing device 909 and a digital watermarking apparatus 901. Although the digital watermarking apparatus 901 basically has the same configuration as that of the digital watermarking apparatus 15c described in the third embodiment of the present invention, it is different in that a verification result from the verifying section 905 is output to the outside of the apparatus. In other words, the verification result from the verifying section 905 is transmitted to the data reproducing device 909.

The data reproducing device 909 reproduces a recording medium 1a such as a tape, a disc, a memory card or the like in which video or audio signal is recorded. The video and audio data output from the data reproducing device 909 is transmitted to the digital watermarking apparatus 901. Watermark information with verification data is input to the verifying section 905. Here, the verification data is as described in the third embodiment of the present invention. The verifying section 905 verifies the input watermark information with the verification data and transmits the verification result to the data reproducing device 909.

The data reproducing device 909 refers to the verification result transmitted from the digital watermarking apparatus 901 and when there is no error, reproduces the recording medium 1a. Then, the video and audio data is output from the data reproducing device 909 and transmitted to a watermarking section 902 of the digital watermarking apparatus 901. The watermarking section 902 embeds the verified watermark information obtained from the verifying section 905 in the video and audio data and outputs the video and audio data embedded with the watermark information to the outside of the apparatus.

Meanwhile, the data reproducing device 909 refers to the verification result from the digital watermarking apparatus 901 and when there is an error, it does not reproduce the recording medium 1a. In addition, the reproducing device 909 may invalidate the video and audio data so that they are hardly viewed or heard and output the invalidated data, or may output dummy data, instead of not reproducing the recording medium 1a. In this case, the watermarking section 902 may not perform the watermark information embedding operation since it cannot obtain normal video and audio data. As a result, no or ineffective video and audio data is output from the information reproducing apparatus 10a.

It should be noted that, in the above description, although the example in which the digital watermarking apparatus described in the third embodiment is modified is used as the digital watermarking apparatus 901, the configuration of the digital watermarking apparatus 901 is not limited to this. More specifically, the digital watermarking apparatus having the verifying section described in the fourth to the eighth embodiments can be used as the digital watermarking apparatus 901 of this embodiment by changing a configuration such that the verification result from the verifying section can be output to the outside of the digital watermarking apparatus 901. Thus, not only the watermark information but also the set values can be verified.

As described above, according to this embodiment, the verifying section in the digital watermarking apparatus verifies the watermark information or the set values to detect the alteration of the information. Since the verification result is transmitted to the reproducing device, the reproducing device does not reproduce the video and audio data. Thus, when the alteration is performed, not only the video and audio can be neither viewed nor heard, but also an output source of the video and audio data is stopped, so that the video and audio data does not exist in the apparatus as a signal. As a result, the video and audio signal is prevented from being intercepted and the protecting means is safely and surely implemented. Consequently, there can be provided a safe system configuration in which the watermark information or the set values are prevented from being altered.

Tenth Embodiment

Figure 11:
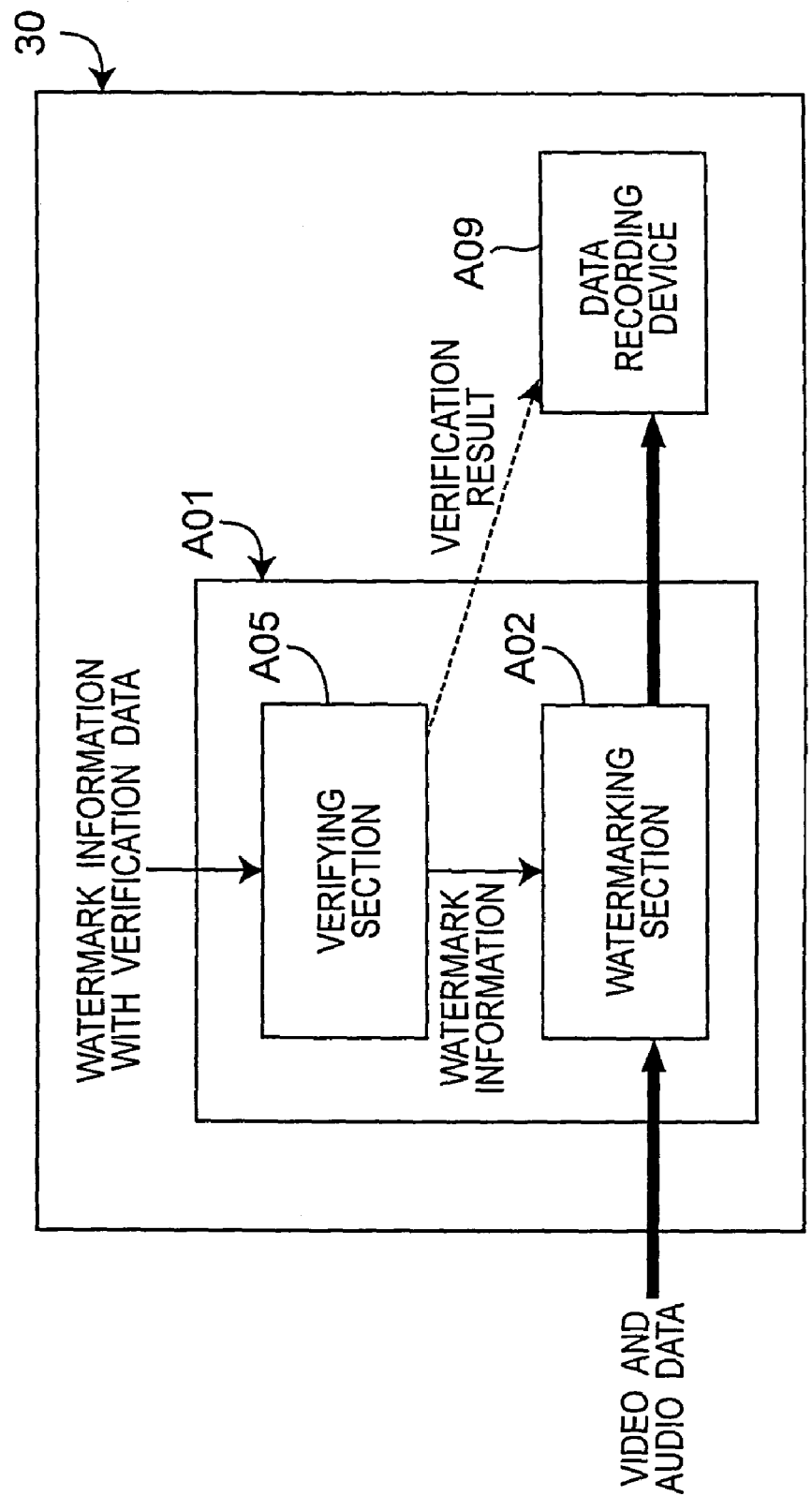
FIG. 11 is a view showing a configuration of an information recording apparatus using the digital watermarking apparatus according to the present invention.

FIG. 11 illustrates a configuration of an information recording apparatus which is one of application devices using the above digital watermarking apparatus. The information recording apparatus 30 includes a digital watermarking apparatus A01 and a data recording device A09.

Although the digital watermarking apparatus A01 has basically the same configuration as that of the digital watermarking apparatus 15c described in the third embodiment, there is difference in that a verification result from a verifying section A05 can be output to the outside of the apparatus. The data recording device A09 records video and audio data in the recording medium such as a tape, a disc, a memory card or the like.

The verification result from the verifying section A05 is transmitted to the data recording device A09. In addition, the video and audio data in which the watermark information is embedded is transmitted to the recording device A09. Watermark information with the verification data is input to the verifying section A05. The verification data means the data which was added to detect an error of the watermark information and it is the same as that described in the third embodiment of the present invention.

The watermarking section A02 obtains the verified watermark information from the verifying section 305 and embeds the watermark information in the video and audio data input to the information recording apparatus 30.

The verifying section A05 verifies the watermark information and transmits the verification result to the recording device A09.

The data recording device A09 refers to the verification result transmitted from the digital watermarking apparatus A01 and when there is no error, performs a recording operation. Thus, the video and audio data in which the watermark information is embedded is recorded by the data recording device A09.

Meanwhile, when there is an error, the data recording device A09 does not perform the recording operation. The data recording device A09 may invalidate the video and audio data transmitted from the digital watermarking apparatus A01 so that they are hardly viewed or heard and record it, or may output dummy data, instead of not performing the recording operation. In this case, the watermarking section A02 may not perform a process of digital watermarking since the normal video and audio data are not recorded.

In the above description, the example in which the digital watermarking apparatus described in the third embodiment is varied is used as the digital watermarking apparatus A01. However, the configuration of the digital watermarking apparatus A01 is not limited to this. More specifically, the digital watermarking apparatus having the verifying section described in the fourth to the eighth embodiments can be used as the digital watermarking apparatus A01 of this embodiment by changing a configuration such that the verification result from the verifying section can be output to the outside of the digital watermarking apparatus A01. Thus, not only the watermark information but also the set values can be verified.

As described above, according to this embodiment of the present invention, the verifying section in the digital watermarking apparatus verifies the watermark information and the set values and thus can detect the alteration of the information. Furthermore, the verification result is transmitted to the recording device, and then the recording device may not record the video and audio data according to the verification result. Thus the watermark information or the set values can be prevented from being altered.

Eleventh Embodiment

Figure 12:
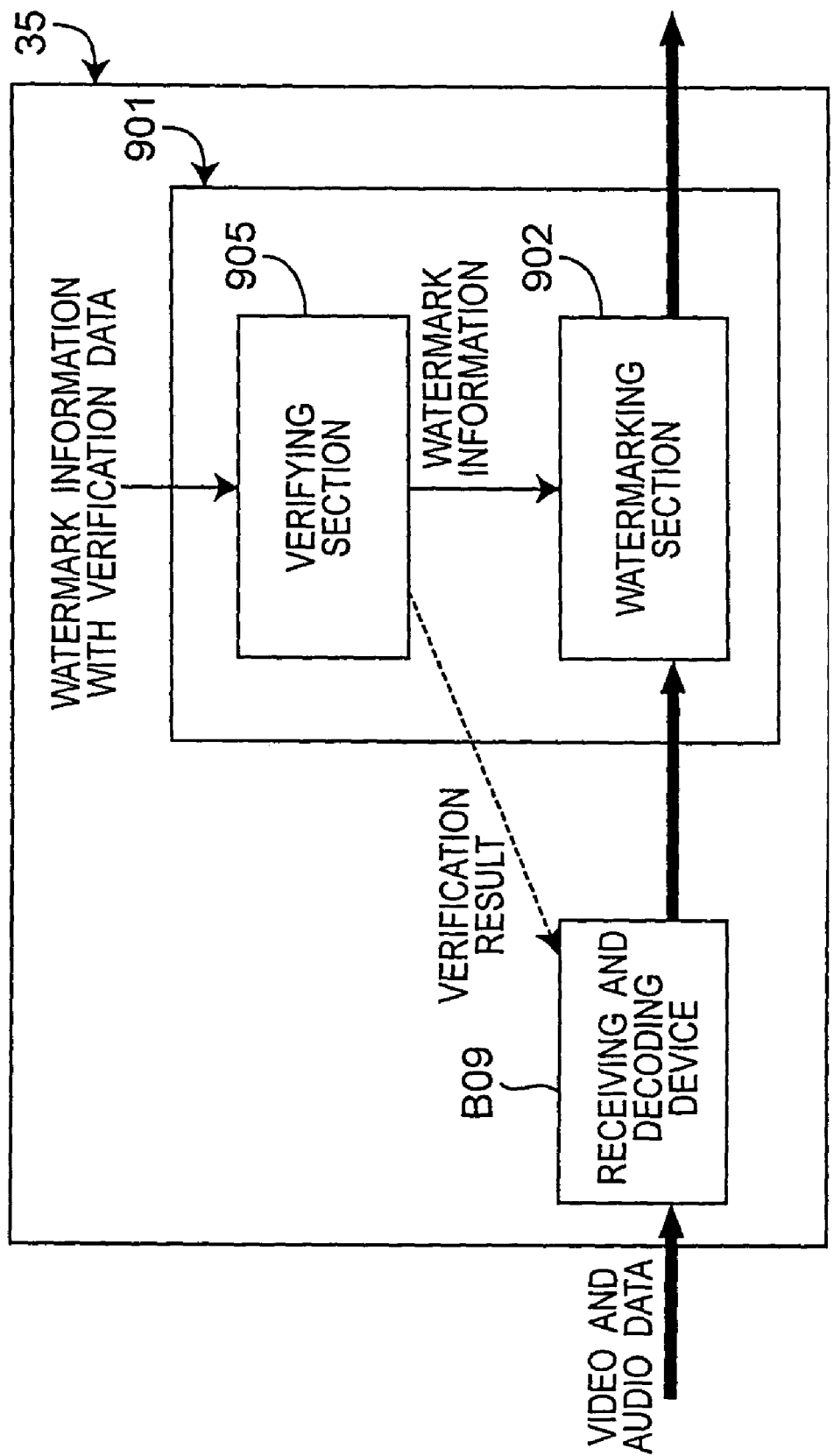
FIG. 12 is a view showing a configuration of an information receiving apparatus using the digital watermarking apparatus according to the present invention.

In the ninth embodiment, the description is made of the example in which the digital watermarking apparatus is applied to the information reproducing apparatus. In this embodiment, a description is made of an example in which the digital watermarking apparatus is applied to an information receiving apparatus. As shown in FIG. 12, an information receiving apparatus 35 includes a receiving and decoding device B09 which receives encoded video or audio data through a wireless and/or wired communication channel and decodes to outputs them, and a digital watermarking apparatus 901. The configuration and operation of the digital watermarking apparatus 901 are the same as those described in the tenth embodiment of the present invention.

More specifically, the receiving and decoding device B09 refers to a verification result from the digital watermarking apparatus 901. When there is an error in the watermark information or the set values, the receiving and decoding device B09 does not perform receiving and/or decoding operation. Only when there is no error, the receiving and decoding device B09 performs the receiving and decoding operations and outputs the received and decoded video and audio information to the digital watermarking apparatus 901. The digital watermarking apparatus 901 embeds the watermark information in the information output from the receiving and decoding device B09 and outputs it.

The receiving and decoding device B09 may invalidate the video and audio data so that they are hardly viewed or heard and output it, or may output dummy data, instead of not performing receiving and decoding operations. As described in the tenth embodiment of the present invention, another digital watermarking apparatus having the verifying section can be used as the digital watermarking apparatus 901.

As described above, according to the information receiving apparatus of this embodiment, since alteration of the watermark information or the set values can be detected and when the alteration was detected, the received information is not correctly transmitted, thus fraud can be prevented.

Twelfth Embodiment

Figure 13:
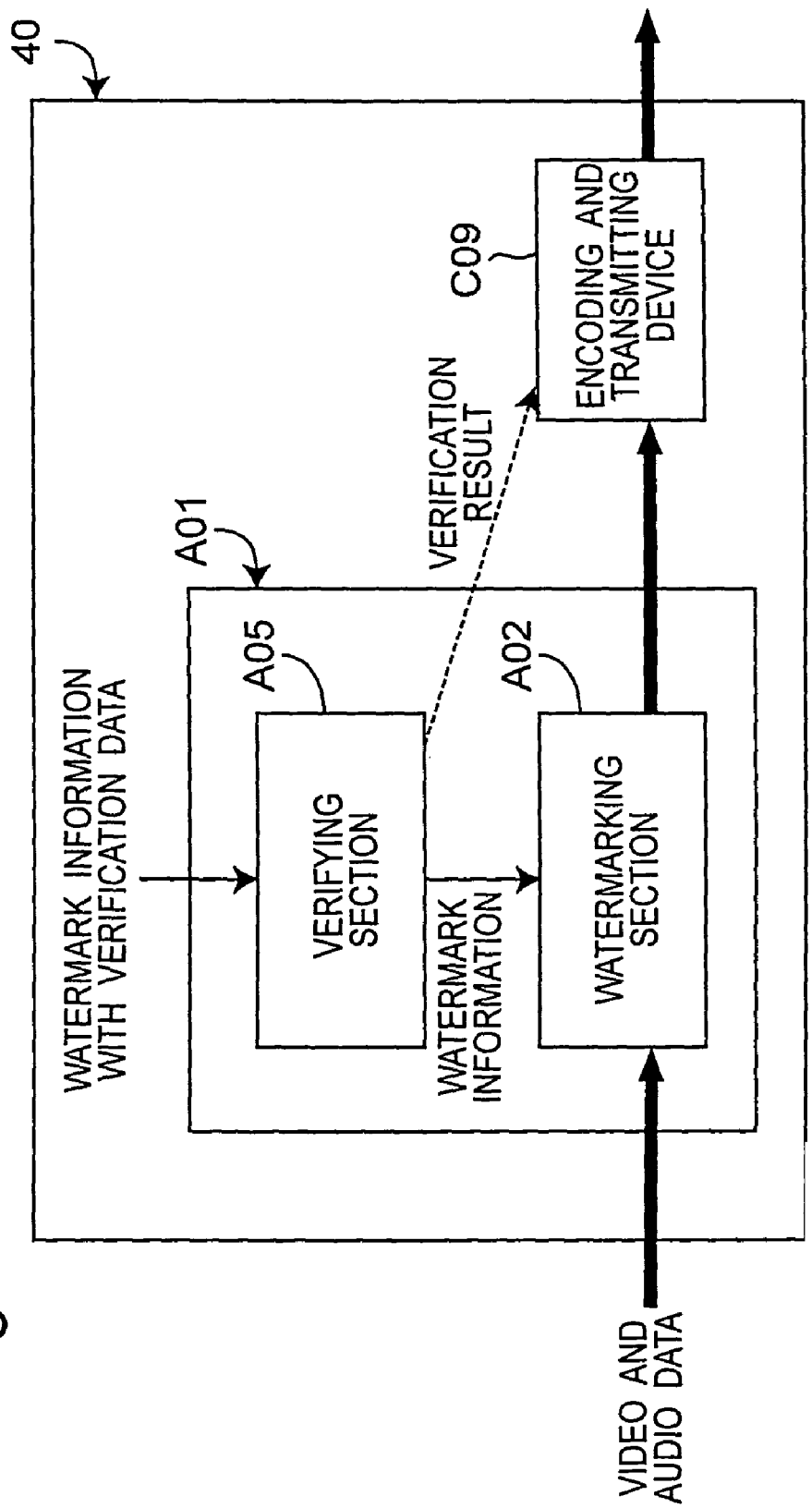
FIG. 13 is a view showing a configuration of an information transmitting apparatus using the digital watermarking apparatus according to the present invention.

In the tenth embodiment, the description is made of the example in which the digital watermarking apparatus is applied to the information recording apparatus. In this embodiment, a description is made of an example in which the digital watermarking apparatus is applied to an information transmitting apparatus. As shown in FIG. 13, an information transmitting apparatus 40 includes a digital watermarking apparatus A01 and encoding and transmitting device C09. The encoding and transmitting device C09 encodes video or audio data and transmits them through a wireless and/or wired communication channel. The configuration and operation of the digital watermarking apparatus A01 are the same as those described in the eleventh embodiment of the present invention.

The encoding and transmitting device C09 refers to a verification result from the digital watermarking apparatus A01. When there in an error in the watermark information or the set values, the encoding and transmitting device C09 does not perform encoding and/or transmitting operation. Only when there is no error, it performs the encoding and transmitting operations.

The encoding and transmitting device C09 may invalidate the video and audio data so that they are hardly viewed or heard and encode it, or may invalidate and transmit it, or may encode or transmit dummy data, instead of not performing encoding and/or transmitting operations. As described in the eleventh embodiment of the present invention, another digital watermarking apparatus having the verifying section can be used as the digital watermarking apparatus A01.

As described above, according to the information transmitting apparatus of this embodiment, since alteration of the watermark information or the set values can be detected, and when the alteration was detected, correct information is not transmitted, thus fraud can be prevented.

In description of each embodiment above, the watermark information is stored in advance in a recording medium, such as an IC card, which is different from a recording medium storing contents. Unlike this, as the watermark information, it is possible to use various kinds of data stored in the contents storing medium (for example, tape, disk, memory card, etc.) or various kinds of data possessed by the apparatus. The various kinds of data stored in the contents storing medium include, for example, ID of the medium, ID of the content, and ID of the copyright owner. The various kinds of data possessed by the apparatus include, for example, ID of the apparatus, date and time provided by a timer of the apparatus, and ID of the user of the apparatus. By protecting such various kinds of data and embedding them as watermark information in a method described in the above embodiments of the present invention, the data can be detected as the watermark from the video or audio data illegally copied, and thus the source of illegal copy can be tracked.

In the above embodiments, the watermark information and set values are read from the recording medium such as an IC card and used. Unlike this, the apparatus may be connected to a network, and various IDs used for the watermark information or set values required for embedding the digital watermark may be downloaded from a server via the network. When the data downloaded via the network are used, the watermark information and set values may be protected and used in a method described in each embodiment of the present invention, thus resulting in the same effects as described above.

The apparatus in each embodiment of the present invention described above can be implemented in hardware, or one part or whole of the operations can be implemented in software in a computer. Furthermore, although the video or audio information are used as information to which the watermark information is added in each embodiment, another type of information may be used.

According to the present invention, in the digital watermarking apparatus or the application apparatus using the same, the watermark information or the set values necessary for the watermark information embedding operation are kept confidential from the outside of the apparatus, and thus alteration of the watermark information can be prevented. Furthermore, the alteration of the watermark information can be detected before embedding digital watermark and the video or audio output can be stopped or invalidated when the alteration is detected, so that the video or audio cannot be viewed or heard. As a result, fraud can be prevented.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The present disclosure relates to subject matter contained in Japanese Patent Application No. 2002-210728, filed on Jul. 19, 2002, which is expressly incorporated herein by reference in its entirety.

What is claimed is:

1. A digital watermarking apparatus for receiving predetermined information and embedding a digital watermark into the predetermined information, said digital watermark apparatus comprising:

a verification unit operable to receive set value information, the set value information including (i) encrypted set values necessary to embed the digital watermark, combined with (ii) verification data, operable to verify the set value information by verifying the encrypted set values using the verification data, and operable to selectively generate a normal verification result and a not normal verification result;

a decryption unit operable to decrypt the encrypted set values of the set value information verified by said verification unit; and a watermarking unit operable to embed the digital watermark into the received predetermined information, operable to output the predetermined information embedded with the digital watermark, and operable to invalidate the received predetermined information, wherein:

the normal verification result results in said watermarking unit embedding the digital watermark into the received predetermined information according to the set values decrypted by said decryption unit, and outputting the predetermined information embedded with the digital watermark; and the not normal verification result results in said watermarking unit selecting one of (i) not outputting the received predetermined information, and (ii) invalidating the received predetermined information and outputting the invalidated received predetermined information.

2. The digital watermarking apparatus according to claim 1, wherein said verification unit is operable to verify the encrypted set values using a digital signature and public key encryption.

3. An application apparatus comprising:

a reproducing unit operable to reproduce predetermined information stored on a recording medium; and said digital watermarking apparatus according to claim 1 operable to receive the predetermined information reproduced by said reproducing unit and operable to embed the digital watermark into the predetermined information, wherein:

said reproducing unit is operable to receive the verification result from said verification unit of said digital watermarking apparatus;

the normal verification result results in said reproducing unit reproducing the predetermined information; and the not normal verification result results in said application apparatus selecting one of (i) said reproducing unit not reproducing the predetermined information, and (ii) said digital watermarking apparatus invalidating an output of said reproducing unit.

4. An application apparatus comprising:
a receiving and decoding unit operable to receive predetermined information from a communication medium and operable to decode the predetermined information; and
said digital watermarking apparatus according to claim 1 operable to receive the decoded predetermined information and operable to embed the digital watermark into the decoded predetermined information, wherein:
said receiving and decoding unit is operable to receive the normal verification result and the not normal verification result from said verification unit of said digital watermarking apparatus;
the normal verification result results in said receiving and decoding unit receiving the predetermined information and decoding the predetermined information; and
the not normal verification result results in said application apparatus selecting one of (i) said receiving and decoding unit not performing at least one of the receiving and the decoding, and (ii) said digital watermarking apparatus invalidating an output of said receiving and decoding unit.

5. An application apparatus comprising:
said digital watermarking apparatus according to claim 1; and
a recording unit operable to receive information output from said digital watermarking apparatus and operable to record the received information onto a recording medium, wherein:
said recording unit is operable to receive the verification result from said verification unit of said digital watermarking apparatus;
the normal verification result results in said recording unit recording the information output from said digital watermarking apparatus; and
the not normal verification result results in said application apparatus selecting one of (i) said recording unit not performing the recording of the predetermined information, and (ii) invalidating the information output from said digital watermarking apparatus and said recording unit recording the invalidated information.

6. An application apparatus comprising:
said digital watermarking apparatus according to claim 1; and
an encoding and transmitting unit operable to encode information output from said digital watermarking apparatus and transmit the encoded information through a communication medium, wherein:
said encoding and transmitting unit is operable to receive the verification result from said verification unit of said digital watermarking apparatus;
the normal verification result results in said encoding and transmitting unit encoding the information output from said digital watermarking apparatus and transmitting the encoded information through a communication medium; and
the not normal verification result results in said application apparatus selecting one of (i) said encoding and transmitting unit not performing at least one of the encoding and the transmitting, and (ii) invalidating the information output from said digital watermarking apparatus and said encoding and transmitting unit performing the encoding and the transmitting.

7. A digital watermarking apparatus for receiving predetermined information and for embedding a digital watermark into the predetermined information, said digital watermarking apparatus comprising:
a decryption unit operable to receive set value information, the set value information including (i) verification data, combined with (ii) encrypted set values necessary to embed the digital watermark and encrypt at least a part of the set values combined with the verification data, and operable to decrypt the set value information;
a verification unit operable to verify the decrypted set values combined with the verification data included from the set value information decrypted by said decryption unit, and operable to selectively generate a normal verification result and a not normal verification result; and
a watermarking unit operable to obtain the verified set values from said verification unit, embed the digital watermark into the received predetermined information, and output the predetermined information embedded with the digital watermark, wherein:
the normal verification result results in said watermarking unit obtaining the verified set values from said verification unit, embedding the digital watermark in the received predetermined information using the obtained set values, and outputting the predetermined information embedded with the digital watermark; and
the not normal verification result results in said watermarking unit not outputting the received predetermined information.

8. The digital watermarking apparatus according to claim 7, wherein said verification unit is operable to verify the decrypted set values using a digital signature and public key encryption.

9. An application apparatus comprising:
a reproducing unit operable to reproduce predetermined information stored on a recording medium; and
said digital watermarking apparatus according to claim 7 operable to receive the predetermined information reproduced by said reproducing unit and operable to embed the digital watermark into the predetermined information, wherein:
said reproducing unit is operable to receive the verification result from said verification unit of said digital watermarking apparatus;
the normal verification result results in said reproducing unit reproducing the predetermined information stored on the recording medium; and
the not normal verification results results in said application apparatus selecting one of (i) said reproducing unit not reproducing the predetermined information, and (ii) said digital watermarking apparatus invalidating an output of said reproducing unit.

10. An application apparatus comprising:
a receiving and decoding unit operable to receive predetermined information from a communication medium and operable to decode the predetermined information; and
said digital watermarking apparatus according to claim 7 operable to receive the decoded predetermined information and operable to embed the digital watermark into the decoded predetermined information, wherein:
said receiving and decoding unit is operable to receive the verification result from said verification unit of said digital watermarking apparatus;

the normal verification result results in said receiving and decoding unit receiving the predetermined information and decoding the predetermined information; and the not normal verification result results in said application apparatus selecting one of (i) said receiving and decoding unit not performing at least one of the receiving and the decoding, and (ii) said digital watermarking apparatus invalidating an output of said receiving and decoding unit.

11. An application apparatus comprising:

said digital watermarking apparatus according to claim 7; and a recording unit operable to receive information output from said digital watermarking apparatus and operable to record the received information onto a recording medium, wherein:

said recording unit is operable to receive the verification result from said verification unit of said digital watermarking apparatus;

the normal verification result results in said recording unit recording the information output from said digital watermarking apparatus; and the not normal verification result results in said application apparatus selecting one of (i) said recording unit not recording the received information, and (ii) invalidating the information output from said digital watermarking apparatus and said recording unit recording the invalidated information.

12. An application apparatus comprising:

said digital watermarking apparatus according to claim 7; and an encoding and transmitting unit operable to encode information output from said digital watermarking apparatus and transmit the encoded information through a communication medium, wherein:

said encoding and transmitting unit is operable to receive the verification result from said verification unit of said digital watermarking apparatus;

the normal verification result results in said encoding and transmitting unit encoding the information output from said digital watermarking apparatus and transmitting the encoded information; and the not normal verification result results in said application apparatus selecting one of (i) said encoding and transmitting unit not performing at least one of the encoding and the transmitting, and (ii) invalidating the information output from said digital watermarking apparatus and said encoding and transmitting unit performing the encoding and the transmitting.

* * * * *